United States Patent
Yang et al.

(10) Patent No.: US 9,048,882 B2
(45) Date of Patent: Jun. 2, 2015

(54) NEAR FIELD COMMUNICATIONS (NFC) AND PROXIMITY SENSOR FOR PORTABLE DEVICES

(75) Inventors: Songnan Yang, San Jose, CA (US); Anand S. Konanur, San Jose, CA (US); Ulun Karacaoglu, San Diego, CA (US); Hao-Han Hsu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,576

(22) PCT Filed: Mar. 15, 2012

(86) PCT No.: PCT/US2012/029301
§ 371 (c)(1),
(2), (4) Date: Apr. 21, 2014

(87) PCT Pub. No.: WO2013/137892
PCT Pub. Date: Sep. 19, 2013

(65) Prior Publication Data
US 2014/0220887 A1 Aug. 7, 2014

(51) Int. Cl.
*H04B 5/00* (2006.01)
*H04M 1/00* (2006.01)
*G06K 7/10* (2006.01)

(52) U.S. Cl.
CPC .......... *H04B 5/0043* (2013.01); *G06K 7/10237* (2013.01)

(58) Field of Classification Search
USPC .......................... 455/41.1, 41.2, 552.1, 553.1
See application file for complete search history.

(56) References Cited

U.S. PATENT DOCUMENTS

| | | |
|---|---|---|
| 2007/0222609 A1 | 9/2007 | Duron et al. |
| 2010/0190436 A1* | 7/2010 | Cook et al. ............... 455/41.1 |
| 2010/0201513 A1* | 8/2010 | Vorenkamp et al. ......... 455/41.1 |
| 2011/0251892 A1 | 10/2011 | Laracey |
| 2011/0260882 A1 | 10/2011 | Lee et al. |
| 2011/0293095 A1 | 12/2011 | Ben Ayed |

FOREIGN PATENT DOCUMENTS

WO 2013/137892 A1 9/2013

OTHER PUBLICATIONS

International Search Report and Written Opinion received for PCT Patent Application No. PCT/US2012/029301, mailed on Nov. 16, 2012, 9 pages.

* cited by examiner

*Primary Examiner* — Quochien B Vuong
(74) *Attorney, Agent, or Firm* — Forefront IP Lawgroup, PLLC (57) ABSTRACT

Described herein are techniques related to near field coupling and proximity sensing operations. For example, a proximity sensor uses a coil antenna that is utilized for near field communications (NFC) functions. The proximity sensor may be integrated into an NFC module to form a single module.

40 Claims, 5 Drawing Sheets

NEAR FIELD COMMUNICATIONS (NFC) AND PROXIMITY SENSOR FOR PORTABLE DEVICES

BACKGROUND

Technologies have arisen that allow near field coupling (such as wireless power transfers (WPT) and near field communications (NFC)) between wireless portable devices in close proximity to each other and more particularly, thin portable electronic devices. Near field coupling functions use radio frequency (RF) antennas in each of the devices to transmit and receive electromagnetic signals. Because of user desires, and/or for esthetic reasons, many of these portable wireless devices are small, and are becoming smaller as markets evolve, and tend to have exaggerated aspect ratios when viewed from the side. As a result, many thin portable devices incorporate flat antennas, which use coils of conductive material as their radiating antennas for use in near field coupling functions.

Meanwhile, (capacitive) proximity sensors may be used in tablets (portable device) with embedded wireless wide-area network (WWAN), such as a third generation or a fourth generation (3G/4G) digital radio, in order to pass Federal Communications Commission (FCC) regulations such as, specific absorption rate (SAR). For example, the proximity sensors may detect human body within proximity, and may use a sensor electrode of relatively large size to implement proximity detection. Both the NFC and the proximity sensor devices may require significant space in a portable device and neither may be covered by metallic chassis/shielding. In other words, the NFC and the proximity sensor devices may be competing for a very limited space for antennas on the wireless device (e.g., tablets). The limited space even becomes more challenging as the portable device gets thinner and adopts a full metallic chassis. To this end, performances of the NFC and/or the proximity sensor may be compromised when their respective sizes get compacted in order to fit within a thin portable device. Accordingly, a solution may be implemented to provide efficiency on performances of the proximity sensor and the NFC devices in the thin portable device.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for using the same coil antenna of thin portable devices for proximity sensing and near field coupling capabilities of the portable devices. Near field coupling includes (by way of illustration and not limitation) wireless power transfer (WPT) and/or near field communications (NFC) capabilities of the portable devices. In an implementation, a proximity sensor is integrated with a NFC module to form a single module. The single module may be connected to a coil antenna that receives an electrical signal for both proximity sensing operations and NFC operations. The proximity sensing operation may be configured to operate at a low frequency electrical signal (e.g., 30 KHz) to detect a human being within proximity, or to detect metallic components of another device within proximity range. The NFC operations may be configured to operate at a high frequency electrical signal (e.g., 13.56 MHz) to perform the NFC functions. In an implementation, the coil antenna is configured to include an open ended spiral shape coil antenna during proximity sensing operations by the proximity sensor. On the other hand, during NFC operations, the coil antenna is configured to include a close ended spiral shape coil antenna to perform the NFC functions by the NFC module.

In an implementation, passive devices or components (e.g., resistor-capacitor low pass filter) may be installed to separate the proximity sensing operation from the NFC operations. In this implementation, the proximity sensing electrical signal is isolated from the NFC electrical signal. In other implementations, a software implementation uses active devices (e.g., switches) to separate the proximity sensing electrical signal from the NFC electrical signal.

Example System

Figure 1:
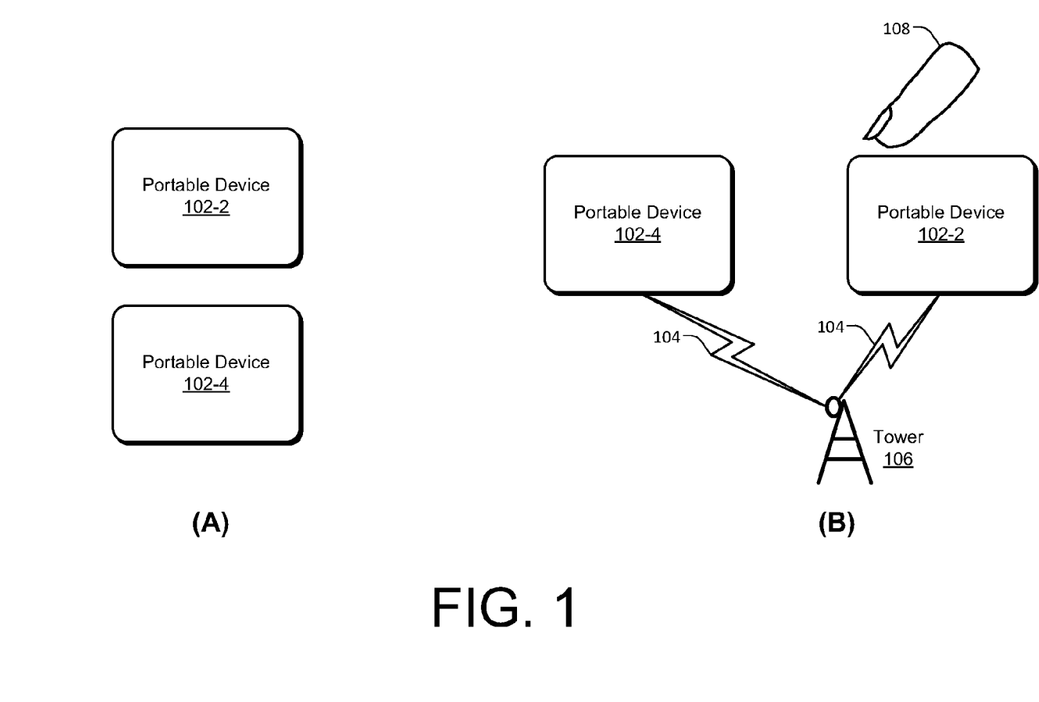
FIG. 1A illustrates an example near field coupling arrangement between portable devices to perform near field communications (NFC) related functions.
FIG. 1B illustrates an example wireless communications arrangement between portable devices that includes proximity sensing operation.

FIG. 1A illustrates an example arrangement of portable devices that performs NFC functions. More particularly, users may have a desire to operate near field coupling enabled portable electronic devices and/or other devices in certain ergonomically convenient manners. Examples of such portable devices include (but are not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

In an implementation, FIG. 1A shows a so-called "NFC bump" where two users (not shown) "bump" their NFC-enabled portable devices 102-2 and 102-4 together in an edge-to-edge or head-to-head manner to perform NFC-related information sharing functions. FIG. 1A shows an often desired side-by-side arrangement of the portable devices 102 for NFC purposes. The portable devices 102-2 and 102-4 may include a multiple loop (spiral shape) coil antenna (not shown) to perform the NFC operations. The NFC operations may include data communications between the portable devices 102. For example, the portable device 102-2 may transfer information to the portable device 102-4 through near filed coupling operations.

FIG. 1B illustrates wireless communications between the portable device 102-2 and the portable device 102-4. In an implementation, the portable devices 102-2 and 102-4 may include a proximity sensor circuit (not shown) that utilizes the multiple loop coil antenna to perform proximity sensing detection. The proximity sensing detection may be used to comply with FCC (and other) regulations such as, the SAR. The SAR may relate to regulatory limits regarding human exposure to electromagnetic energy from wireless devices such as the portable devices 102.

In an implementation, the portable devices 102-2 and 102-4 may include a wireless communications circuit (not shown) that includes one or more transceiver antennas (not shown). The wireless communication circuit may be configured to operate in accordance with one or more wireless standards. For example, the wireless communication circuit may be configured to wirelessly transfer information between the portable device 102-2 and the portable device 102-4 via a wireless communication link 104 (through a tower 106) that is established in accordance with at least one of a 3G or 4G digital wireless communication standard. Such a 3G or 4G digital wireless communication standard may include one or more of a WiMax communication standard (e.g., in accordance with the IEEE 802.16 family of standards such as IEEE 802.16-2009), a Third-Generation Partnership Project (3GPP) Long-Term-Evolution (LTE) communication standard, or one or more other standards or protocols. In an embodiment, the wireless communication circuit may be configured to wireless transfer information in accordance of a Wi-Fi wireless local-area-networking (WLAN) standard, such as one or more of the IEEE 802.11 family of standards (e.g., IEEE. 802.11a-1999, 802.11b-1999, 802.11g-2003, 802.11n-2009, 802.11-2007), or one or more other standards or protocols.

In order to comply with the SAR requirement, the proximity sensing detection may allow the one or more transceiver antennas (not shown) at the portable device 102 to be at receive mode only if a human being (e.g., human being 108) is detected within proximity of the portable device 102 (e.g., portable device 102-2). At another instance, the one or more transceiver antennas may regularly operate at transmitting and receiving mode if no human being 106 is detected by the proximity sensing detection. Furthermore, the transceiver antennas may be configured to throttle transmission power if the human being 108 is detected within proximity of the transceiver antennas. In other implementations, the proximity sensor circuit may utilize the multiple loop coil antenna to detect metallic components (not shown) of another portable device that may come within proximity of the portable device 102-2. This information may be further used to initiate/cease wireless communication/wireless power transfer between the two devices.

Example Portable Device

Figure 2:
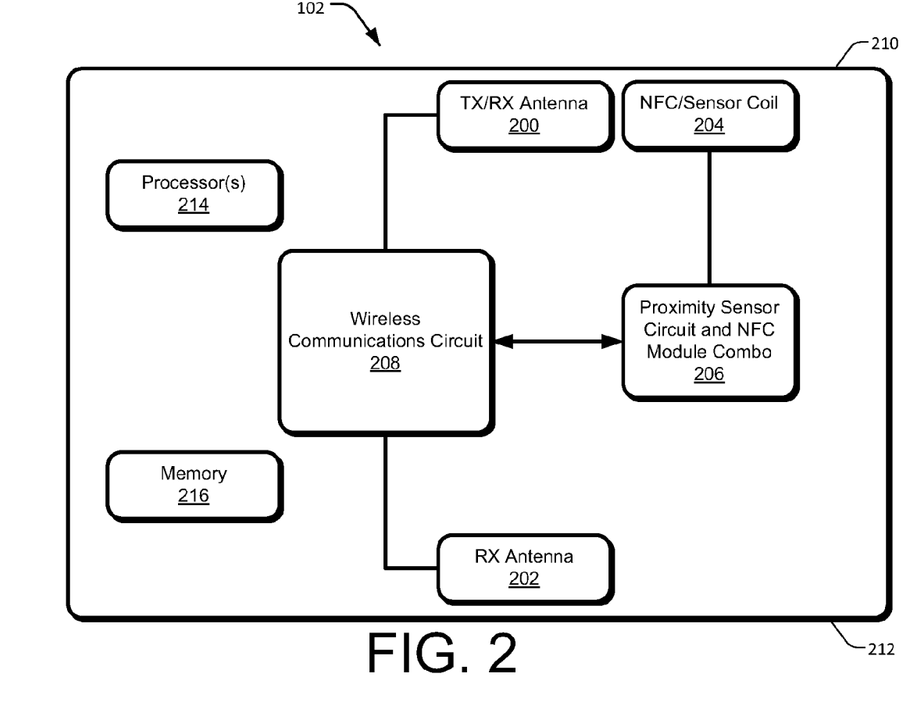
FIG. 2 is a diagram of an example portable device.

FIG. 2 is an example embodiment of the portable device 102 that utilizes the same coil antenna for NFC operations and proximity sensing detection. In an implementation, the wireless device 102 may include a transceiver (TX/RX) antenna 200, a receiver (RX) antenna 202, a NFC or proximity sensor coil antenna (NFC/Sensor coil antenna) 204, a proximity sensor circuit and NFC module combo 206, and a wireless communications circuit 208.

In an implementation, the TX/RX antenna 200 and the NFC/Sensor coil antenna 204 may be located at one edge (e.g., top edge 210) of the portable device 102. Similarly, the RX antenna 202 may be located at another edge (e.g., bottom edge 212) of the portable device 102. In an implementation, the NFC/Sensor coil antenna 204 may be configured to include an open ended spiral shape coil antenna to perform proximity sensing detection. For example, to detect presence or absence of human tissue in proximity to where the NFC/Sensor coil antenna 204 is located. At the same time, during NFC operations, the NFC/Sensor coil antenna 204 may be configured to include a close ended spiral shape coil antenna to perform NFC related functions such as, reading NFC tags, credit cards, or transfer of information using the "NFC bump" between two NFC enabled devices.

In an implementation, the NFC/Sensor coil antenna 204 may carry, transmit, or receive an electrical signal that includes proximity sensing electrical (not shown) signal and NFC electrical signal (not shown). The proximity sensing electrical signal may include a change in capacitive characteristic due to a human being (e.g., human being 106) that comes within proximity, or due to metallic components of another device (e.g., portable device 102-2, 102-4) that is within the proximity range of the NFC/Sensor coil antenna 204. In an implementation, the proximity sensing electrical signal may include a low frequency of operation (e.g., 30 KHz) that may be separated from the NFC electrical signal that includes a high frequency of operation (e.g., 13.56 MHz) to perform NFC related functions.

In an implementation, the proximity sensor circuit and NFC module combo 206 may be configured to process the received electrical signal from the NFC/Sensor coil antenna 204. The proximity sensor circuit and NFC module combo 206 is a single module that includes a proximity sensor (not shown) and a NFC module (not shown). The proximity sensor processes the proximity sensing electrical signal, while the NFC module processes the NFC electrical signal. The proximity sensor circuit and NFC module combo 206 may be coupled to a wireless communications circuit 208. In an implementation, the wireless communications circuit 208 may be configured to adjust the communication parameters such as, a transmit power, in response to information obtained from the proximity sensing operations. The adjustment of the TX/RX antenna 200 mode of operations may be implemented to comply with the SAR requirement of the FCC (and other).

In another implementation, the proximity sensor circuit and NFC module combo 206 may be configured to process the received electrical signal from the NFC/Sensor coil antenna 204 and another NFC/Sensor coil antenna (not shown) that may be located at the edge 212 of the portable device 102. The operation for the proximity sensor circuit and NFC module combo 206 discussed above is similarly applied; however, proximity sensing detection at the NFC/Sensor coil antenna (not shown) that is located at the edge 212 may be considered by the wireless communications circuit 208 in adjusting the communication parameters. For example, if a human is detected within proximity of the NFC/Sensor coil antenna 204 and the other NFC/Sensor coil antenna that is located at the edge 212, transmission power is throttled in the portable device 102.

In another implementation, the portable device 102 may include a proximity sensor component (not shown) that may be integrated with an NFC module (not shown), and the NFC/Sensor coil antenna 204 to form a single module. The proximity sensor component may be used to detect presence of other near field coupling devices (e.g., portable device 102-2, 102-4), or NFC tags/credit card that is within the proximity sensing range of the portable device 102 through detecting the capacitance change introduced by the metallic components within the other portable device, NFC tags, or credit card. During detection operations by the proximity sensor, the NFC/WPT module may be activated or deactivated in performing the NFC and/or WPT operations through the NFC/Sensor coil antenna 204. The activation/deactivation of the NFC and/or WPT operations may avoid continuous RF emissions by the NFC module when no other near field coupling portable device (e.g., portable device 102-2, 102-4) is within proximity range of the portable device 102 to reduce power consumption and RF emission.

Furthermore, the portable device 102 includes one or more processor(s) 214. Processor(s) 214 may be a single processing unit or a number of processing units, all of which may include single or multiple computing units or multiple cores. The processor(s) 214 may be implemented as one or more microprocessors, microcomputers, microcontrollers, digital signal processors, central processing units, state machines, logic circuitries, and/or any devices that manipulate signals based on operational instructions. Among other capabilities, the processor(s) 214 may be configured to fetch and execute computer-readable instructions or processor-accessible instructions stored in a memory 216 or other computer-readable storage media.

In certain implementations, the memory component 216 is an example of computer-readable storage media for storing instructions, which are executed by the processor(s) 214 to perform the various functions described above. For example, memory 216 may generally include both volatile memory and non-volatile memory (e.g., RAM, ROM, or the like). Memory 216 may be referred to as memory or computer-readable storage media herein. Memory 216 is capable of storing computer-readable, processor-executable program instructions as computer program code that may be executed by the processor(s) 214 as a particular machine configured for carrying out the operations and functions described in the implementations herein.

The example portable device 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Proximity Sensor and NFC Module with Passive Devices

Figure 3:
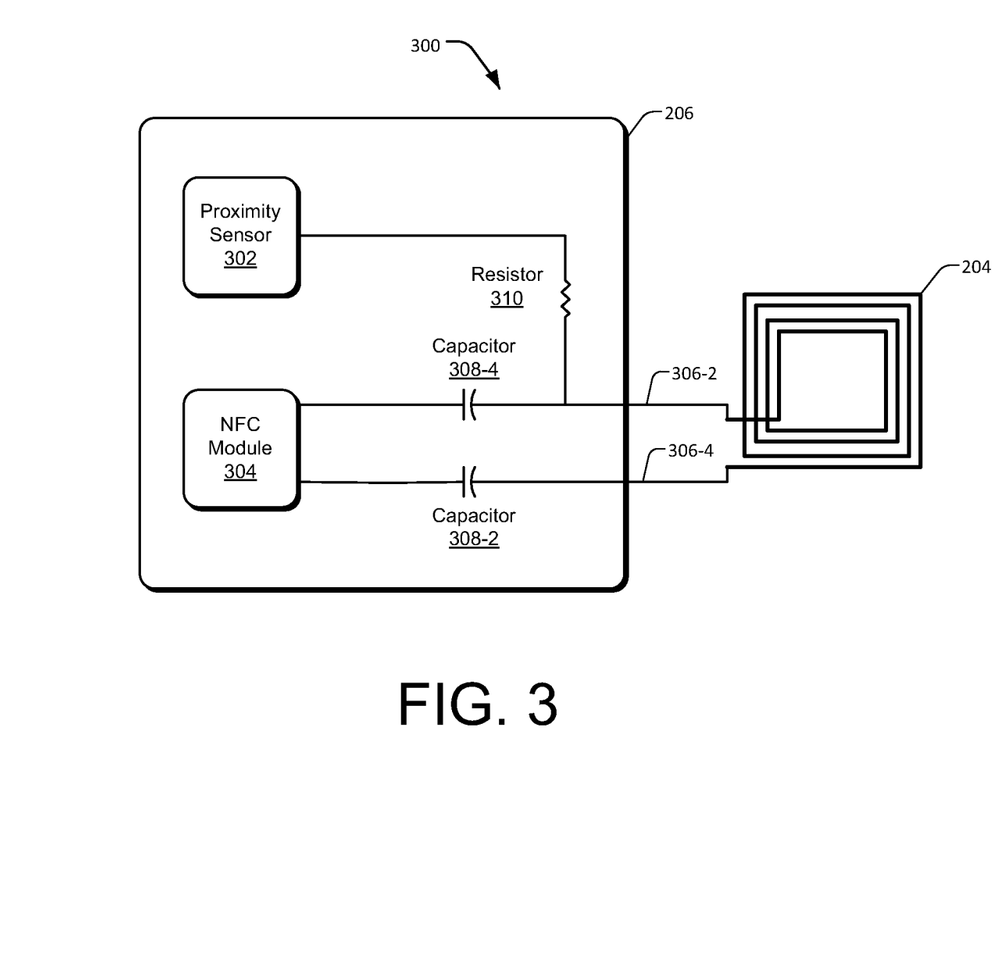
FIG. 3 is a diagram of an example proximity sensor circuit and near field communications (NFC) module combo that includes passive devices.

FIG. 3 is an example implementation 300 of proximity sensor and NFC module with passive devices. The emerging technologies related to near field coupling enable many appealing experiences for users of the portable device 102. For example, integrating a flexible printed circuit (FPC), which incorporates the NFC/Sensor coil antenna 204, into a thin portable device 102 may minimize any increase in the thickness of the portable device 102.

With continuing reference to FIG. 3, the drawing illustrates a proximity sensor 302 and a NFC module 304 that are integrated into a single module (i.e., Proximity sensor circuit and NFC module combo 206). In an implementation, the proximity sensor 302 may be configured to utilize the NFC/Sensor coil antenna 204 to carry the proximity sensing electrical signal. Although the NFC/Sensor coil antenna 204 may be utilized at the same time by the NFC module for NFC related functions, the proximity sensing electrical signal may be separated from the NFC electrical signal through installation of passive devices.

In an implementation, the proximity sensor 302 may be configured to operate at a low frequency electrical signal such as, 30 KHz electrical signal for proximity sensing operations. In this example, the capacitive characteristic is measured by evaluating the charging and discharging current injected into the coil antenna 204. The capacitive characteristic may change when a human comes in proximity with NFC/Sensor coil antenna 204. The change in the capacitive characteristic may be compared to a configured threshold value for capacitance change that may trigger selection of the TX/RX antenna 200 or reduces TX power by the wireless communications circuitry 208. The threshold value may similarly apply to changes in the capacitive characteristic due to metallic components of another portable device that is within proximity of the NFC/Sensor coil antenna 204.

In an implementation, the NFC/Sensor coil antenna 204 may be configured to include an open ended shape during proximity sensing operation. For example, a terminal link 306-2 that is connected to one end of the NFC/Sensor coil antenna 204 may be connected to the proximity sensor 302, and to a terminal of a front-end of the NFC module 304. A second terminal link 306-4 that is connected to another end of the NFC/Sensor coil antenna 204 may be connected to another terminal of the NFC module 304. In an implementation, the front-end terminals of the NFC module 304 are connected to capacitors 308 that link the NFC module 304 to the terminal connections 306 of the NFC/Sensor coil antenna 204. During proximity sensing operations, the capacitors 308 (e.g., 470 pF) may act as an open circuit (i.e., high isolation) to low frequency electrical signal (e.g., 30 KHz). In other words, the terminal connections 306-2 and 306-4 are disconnected to the front-end of the NFC module 304. On the other hand, a low pass filter that includes a passive device resistor 310 may act as a short circuit (i.e., low attenuation) to the 30 KHz proximity sensing electrical signal. Accordingly, for proximity sensing operations, the NFC/Sensor coil antenna 204 present to the Low frequency proximity sensing signal as an open ended spiral shape NFC/Sensor coil antenna 204.

During NFC operations, the capacitors 308 may include a short circuit equivalent at relatively high operating frequency (e.g., 13.56 MHz for NFC operations). On the other hand, the low pass filter that links the NFC/Sensor coil antenna 204 to the proximity sensor 302 may offer an open circuit equivalent at the NFC operations frequency of 13.56 MHz. In other words, during the NFC operations, the low pass filter that links the proximity sensor 302 to the NFC/Sensor coil antenna 204 may isolate the high frequency NFC electrical signals. Accordingly, for NFC operations, the NFC/Sensor coil antenna 204 presents to the High frequency NFC signal as a closed spiral shape NFC/Sensor coil antenna 204.

Example Proximity Sensor and NFC Module with Active Devices

Figure 4:
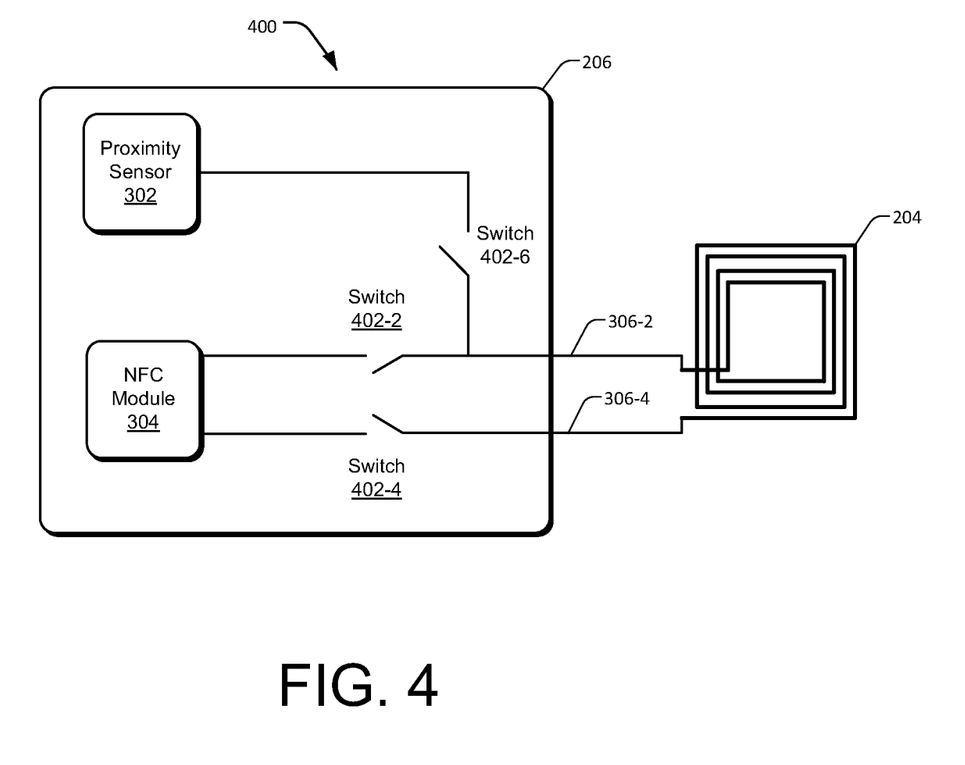
FIG. 4 is a diagram of an example proximity sensor circuit and near field communications (NFC) module combo that includes active devices.

FIG. 4 is an example implementation 400 of proximity sensor and NFC module with active devices. In an implementation, the active devices may be configured to include switches 402-2 and 402-4 to link the front-end terminals of the NFC module 304 to the NFC/Sensor coil antenna 204. Further, a switch 402-6 may be used to link the proximity sensor 302 to the terminal link 306-2 of the NFC/Sensor coil antenna 204. For example, during proximity sensing operation, the switches 402-2 and 402-4 may be configured to include an open circuit, while the switch 402-6 may be configured to include a short circuit. As a result, the NFC/Sensor coil antenna 204 is configured to include the open ended spiral shape during proximity sensing operation by the proximity sensor 302. In another example, during NFC operation, the switches 402-2 and 402-4 may be configured to include a short circuit, while the switch 402-6 may be configured to include an open circuit. As a result, the NFC/Sensor coil antenna 204 is configured to include the close ended spiral shape during the NFC operation by the NFC module 304.

In an implementation, the switches 402 may be dynamically controlled based on usage at the portable device 102. For example, if the TX/RX antenna 200 is not used (e.g., used for 3G transmission), then the NFC/Sensor coil antenna 204 may be dedicated primarily for NFC related functions. As compared to the use of passive devices (i.e., capacitors 308 and resistor 310), the active devices (i.e., switches 402) may be configured to switch back and forth in a time domain between performing the proximity sensing detection at a certain time, and performing the NFC related functions at another time.

Example Process

Figure 5:
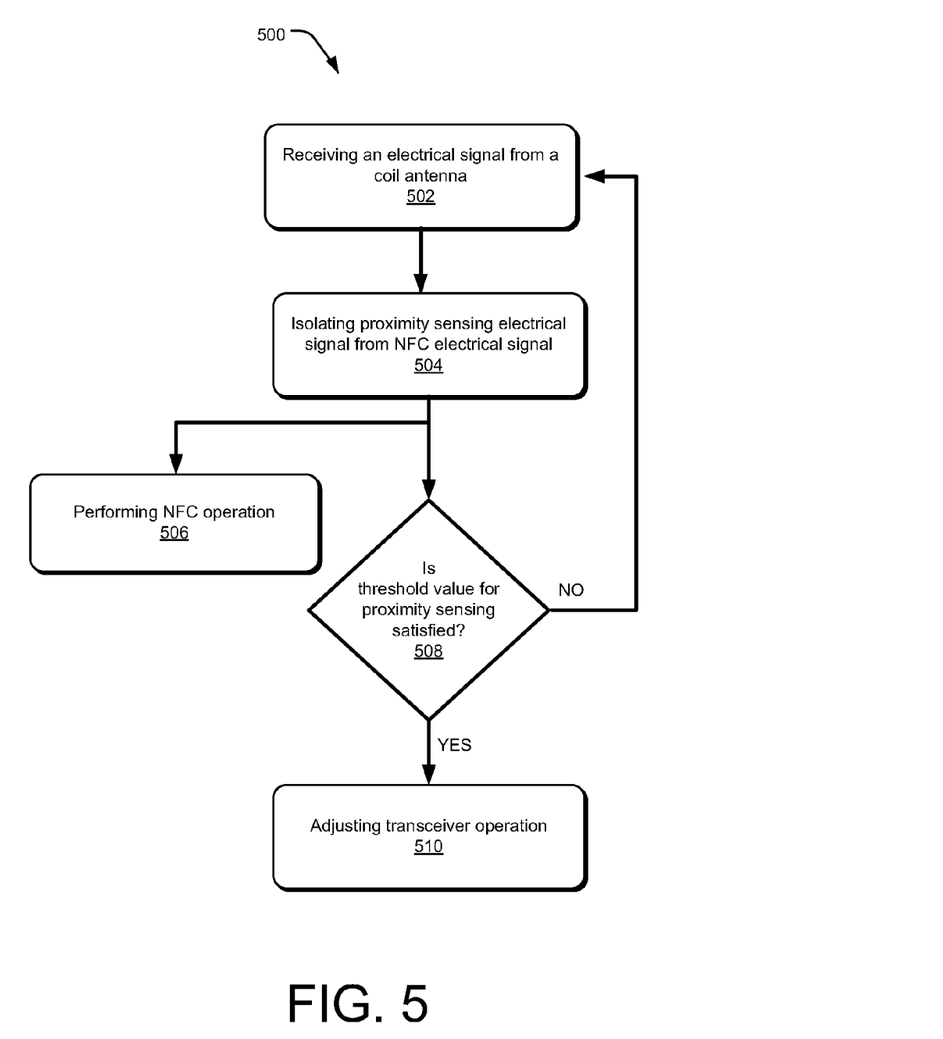
FIG. 5 is a method for proximity sensing and near field communications using the same coil antenna.

FIG. 5 shows an example process chart illustrating an example method for proximity sensing and near field communications using the same coil antenna. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a computer accessible medium may implement proximity sensing operations and NFC operations by utilizing the same coil antenna.

At block 502, carrying, transmitting, or receiving an electrical signal by a coil antenna is performed. In an implementation, the coil antenna (e.g., NFC/Sensor coil antenna 204) may receive, carry, or transmit the electrical signal that includes a proximity sensing electrical signal and a NFC electrical signal. For example, the proximity sensing electrical signal may include a low frequency of operation (e.g., 30 KHz) to implement proximity sensing operation. On the other hand, the NFC electrical signal may include a high frequency of operation (e.g., 13.56 MHz) to implement NFC related functions.

At block 504, isolating the proximity sensing electrical signal from the NFC electrical signal. Since the NFC electrical signal includes a different frequency of operation (i.e., 13.56 MHz) from the proximity sensing electrical signal (i.e., 30 KHz), passive devices (e.g., capacitors 308) may be used to separate the proximity sensing electrical signal from the NFC electrical signal. For example, the use of passive devices (i.e., capacitors 308 and resistor 310) may include a low pass filter between a proximity sensor (e.g., proximity sensor 302) and the NFC/Sensor coil antenna 204 to allow the proximity sensing electrical signal to the proximity sensor 302 while the NFC electrical signal is blocked at the same time. In another example, the use of the passive devices (i.e., capacitors 308 and resistor 310) may include a high pass filter between a NFC module (e.g., NFC module 304) and the NFC/Sensor coil antenna 204 to allow the NFC electrical signal to the NFC module 304 while the proximity sensing electrical signal is blocked at the same time.

In an implementation, the use of the passive devices or components (i.e., capacitors 308 and resistor 310) may configure the NFC/Sensor coil antenna 204 to include an open ended spiral shape coil antenna configuration during proximity sensing operations. On the other hand, the passive devices may configure the NFC/Sensor coil antenna 204 to include a close ended spiral shape coil antenna configuration during NFC operations.

In other implementations, use of active switches (e.g., active switches 402) may be configured (e.g., by a software application) to isolate the proximity sensing electrical signal from the NFC electrical signal. For example, during proximity sensing operations, the switches 402 may allow connection between the proximity sensor 302 and the NFC/Sensor coil antenna 204 while the NFC module 304 is disconnected to from the NFC/Sensor coil antenna 204. In this example, NFC/Sensor coil antenna 204 is configured to include an open ended spiral shape coil antenna configuration during proximity sensing operations. Similarly, the active switches 402 may be configured to transform the NFC/Sensor coil antenna 204 into a close ended spiral shape coil antenna configuration when the switches 402 disconnects the proximity sensor 302 from the NFC/Sensor coil antenna 204 while the NFC module is connected to the NFC/Sensor coil antenna 204.

At block 506, performing NFC related function using the NFC electrical signal is performed.

At block 508, determining if threshold capacitance for proximity sensing operation is satisfied. In an implementation, the proximity sensor 302 processes a variation in capacitance due to a human in proximity of the NFC/Sensor coil antenna 204. A threshold capacitance value may be configured to trigger selection of transceiver antenna (e.g., TX/RX antenna 200) or by adjusting the transmit power through a TX antenna (e.g. TX/RX antenna 200) by wireless communications circuitry to comply with SAR requirements. If the threshold capacitance value is satisfied, following the YES branch of block 510, the adjustment of the transceiver antenna operation is performed.

Otherwise following the NO branch of block 508, at block 502, the NFC/Sensor coil antenna 204 continues to receive the electrical signal.

At block 510, adjustment of the transceiver antenna operation is performed. In an implementation, the transceiver antennas (e.g., TX/RX 200) may be configured to operate in transmit and receive mode at the same time, or at receive mode only, or in throttled transmission power state to comply with the SAR requirements.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method for proximity sensing comprising:
   carrying, transmitting or receiving an electrical signal by an antenna, the electrical signal including a proximity sensing electrical signal and a near field communications (NFC) electrical signal;
   isolating the proximity sensing electrical signal from the NFC electrical signal, the antenna is configured to include an open ended shape during proximity sensing operation, the antenna is configured to include a close ended shape during NFC operation;

performing an NFC operation utilizing the close ended shape antenna; and performing a proximity sensing operation utilizing the open ended shape antenna.

2. A method as recited in claim 1, wherein isolating includes using a low pass filter between a proximity sensor and the open ended antenna to allow the proximity sensor to receive the proximity sensor electrical signal that includes a low frequency of operation, wherein the low pass filter is adapted to block the NFC electrical signal from the proximity sensor.

3. A method as recited in claim 1, wherein isolating includes using a high pass filter between a NFC module and the close ended antenna to allow the NFC module to receive the NFC electrical signal that includes a high frequency of operation, wherein the high pass filter is adapted to block the proximity sensing electrical signal from the NFC module.

4. A method as recited in claim 1, wherein the isolating includes using a NFC module and a proximity sensor, wherein the proximity sensor and the NFC module form a single module.

5. A method as recited in claim 1, wherein the antenna, a proximity sensor and a NFC module form a single module.

6. A method as recited in claim 1, wherein isolating includes using at least one passive device to separate the proximity sensing electrical signal from the NFC electrical signal, wherein the passive device includes a capacitor and/or a resistor.

7. A method as recited in claim 1, wherein isolating includes using active switches configured isolate the open ended antenna from a NFC module during the proximity sensing operation, wherein the active switches are further configured to allow the proximity sensing electrical signal to be received by a proximity sensor.

8. A method as recited in claim 1, wherein isolating includes using active switches configured to isolate the close ended antenna from a proximity sensor during the NFC operation, wherein the active switches are further adapted to allow the NFC electrical signal to be received by a NFC module.

9. A method as recited in claim 1, wherein isolating includes using active switches configured to switch back and forth in a time domain in performing the proximity sensing operation and the NFC operation.

10. A method as recited in claim 1, further comprising comparing input capacitance of the proximity sensing operation electrical signal with a threshold capacitance value, wherein the threshold capacitance value is used as a basis to adjust transceiver operation during wireless communication operations.

11. A method as recited in claim 1, wherein the antenna is a coil antenna.

12. A portable device comprising:
an antenna adapted to carry, transmit or receive an electrical signal, which includes a proximity sensing electrical signal and a near field communications (NFC) electrical signal;
one or more components adapted to isolate the proximity sensing electrical signal from the NFC electrical signal;
a NFC module adapted to process the NFC electrical signal, the NFC module utilizes the antenna to include a close ended antenna during NFC operation; and
a proximity sensor adapted to process the proximity sensing electrical signal, the proximity sensor uses the antenna to include an open ended antenna during proximity sensing operation.

13. A portable device as recited in claim 12, wherein the one or more components include a passive device that includes a low pass filter to allow the proximity sensor to receive and process the proximity sensor electrical signal that includes a low frequency of operation, wherein the low pass filter blocks the NFC electrical signal from the proximity sensor.

14. A portable device as recited in claim 12, wherein the one or more components include a passive device that includes a high pass filter to allow the NFC module to receive and process the NFC electrical signal that includes a high frequency of operation, wherein the high pass filter blocks the proximity sensing electrical signal from the NFC module.

15. A portable device as recited in claim 12, wherein the proximity sensor and the NFC module form a single module.

16. A portable device as recited in claim 12, wherein the antenna includes a multiple loop spiral shape antenna.

17. A portable device as recited in claim 12, wherein the one or more components include a passive device, the passive device includes at least a capacitor and/or a resistor.

18. A portable device as recited in claim 12, wherein the one or more components include active switches to isolate the open ended coil antenna from the NFC module during the proximity sensing operation, wherein the active switches allows the proximity sensing electrical signal to be received and processed by the proximity sensor.

19. A portable device as recited in claim 12, wherein the one or more components include active switches to isolate the close ended coil antenna from the proximity sensor during the NFC operation, wherein the active switches allows the NFC electrical signal to be received and processed by the NFC module.

20. A portable device as recited in claim 12, wherein the one or more components include active switches that are configured to switch back and forth in a time domain in performing the proximity sensing operation and the NFC operation.

21. A portable device as recited in claim 12, wherein the proximity sensor compares an input capacitance of the proximity sensing operation electrical signal with a threshold capacitance value, wherein the threshold capacitance value is used as a basis to adjust transceiver operation during wireless communication operations.

22. A portable device as recited in claim 12, wherein the antenna is a coil antenna.

23. At least one computer accessible medium that performs a method for proximity sensing comprising:
carrying, transmitting, or receiving an electrical signal by an antenna, the electrical signal includes a proximity sensing electrical signal and a near field communications (NFC) electrical signal;
isolating the proximity sensing electrical signal from the NFC electrical signal, the antenna includes an open ended shape during proximity sensing operation, the antenna includes a close ended shape during NFC operation;
performing the NFC operation utilizing the close ended shape antenna; and
performing the proximity sensing operation utilizing the open ended shape antenna.

24. A computer accessible medium as recited in claim 23, wherein the isolating includes using a low pass filter between a proximity sensor and the open ended coil antenna to allow the proximity sensor to receive the proximity sensor electrical signal that includes a low frequency of operation, wherein the low pass filter blocks the NFC electrical signal from the proximity sensor.

25. A computer accessible medium as recited in claim 23, wherein the isolating includes using a high pass filter between a NFC module and the close ended coil antenna to allow the NFC module to receive the NFC electrical signal that includes a high frequency of operation, wherein the high pass filter blocks the proximity sensing electrical signal from the NFC module.

26. A computer accessible medium as recited in claim 23, wherein the isolating includes using a NFC module and a proximity sensor, wherein the proximity sensor and the NFC module form a single module.

27. A computer accessible medium as recited in claim 23, wherein the antenna is configured to include a multiple loop spiral shape antenna.

28. A computer accessible medium as recited in claim 23, wherein the isolating includes using passive devices to separate the proximity sensing electrical signal from the NFC electrical signal, wherein the passive devices includes at least a capacitor and/or a resistor.

29. A computer accessible medium as recited in claim 23, wherein the isolating includes using active switches that isolate the open ended antenna from the NFC module during the proximity sensing operation, wherein the active switches allow the proximity sensing electrical signal to be received by the proximity sensor.

30. A computer accessible medium as recited in claim 23, wherein the isolating includes using active switches that isolate the close ended coil antenna from the proximity sensor during the NFC operation, wherein the active switches allows the NFC electrical signal to be received by the NFC module.

31. A computer accessible medium as recited in claim 23, wherein the isolating includes using active switches to switch back and forth in a time domain in performing the proximity sensing operation and the NFC operation.

32. A computer accessible medium as recited in 23, further comprising comparing input capacitance of the proximity sensing operation electrical signal with a threshold capacitance value, wherein the threshold capacitance value is used as a basis to adjust transceiver operation during wireless communication operations.

33. A computer accessible medium as recited in claim 23, wherein the antenna is a coil antenna.

34. A system comprising:
one or more processors;
memory configured to the one or more processors; and
a near field communications (NFC) component configured to the one or more processors and memory, adapted to process an NFC electrical signal from an antenna adapted to carry, transmit or receive an electrical signal, which includes a proximity sensing electrical signal and the near field communications (NFC) electrical signal, wherein the NFC component uses the antenna to include a close ended antenna during NFC operation; and
a proximity sensor component configured to the one or more processors and memory, adapted to process the proximity sensing electrical signal, the proximity sensor uses the antenna to include an open ended antenna during proximity sensing operation.

35. A system as recited in claim 34 further comprising a passive device of one or both of the following:
a low pass filter to allow the proximity sensor component to receive and process the proximity sensor electrical signal that includes a low frequency of operation, wherein the low pass filter blocks the NFC electrical signal from the proximity sensor; and/or
a high pass filter to allow the NFC component to receive and process the NFC electrical signal that includes a high frequency of operation, wherein the high pass filter blocks the proximity sensing electrical signal from the NFC component.

36. A system as recited in claim 34, further comprising a passive device, wherein the passive device includes a capacitor and/or a resistor.

37. A system as recited in claim 34, further comprising active switches adapted to perform one of the following:
isolate the open ended antenna from the NFC component during the proximity sensing operation, wherein the active switches allows the proximity sensing electrical signal to be received and processed by the proximity sensor component;
isolate the close ended antenna from the proximity sensor component during the NFC operation, wherein the active switches allows the NFC electrical signal to be received and processed by the NFC component.

38. A system as recited in claim 34, further comprising one or more components adapted to isolate the proximity sensing electrical signal from the NFC electrical signal.

39. A system as recited in claim 34, wherein the antenna is included in a module that includes the NFC component and proximity sensor component.

40. A system as recited in claim 34, wherein the antenna is a coil antenna.

* * * * *